US010530207B2

(12) United States Patent
Nakahara et al.

(10) Patent No.: US 10,530,207 B2
(45) Date of Patent: Jan. 7, 2020

(54) ROTOR OF ROTARY ELECTRIC MACHINE AND ROTARY ELECTRIC MACHINE USING THE SAME

(71) Applicant: Hitachi Automotive Systems, Ltd., Hitachinaka-shi, Ibaraki (JP)

(72) Inventors: Akihito Nakahara, Tokyo (JP); Yutaka Matsunobu, Hitachinaka (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 222 days.

(21) Appl. No.: 15/528,986

(22) PCT Filed: Nov. 11, 2015

(86) PCT No.: PCT/JP2015/081675
§ 371 (c)(1),
(2) Date: May 23, 2017

(87) PCT Pub. No.: WO2016/084602
PCT Pub. Date: Jun. 2, 2016

(65) Prior Publication Data
US 2017/0346355 A1    Nov. 30, 2017

(30) Foreign Application Priority Data

Nov. 28, 2014  (JP) ................................ 2014-240727

(51) Int. Cl.
*H02K 1/27*    (2006.01)
(52) U.S. Cl.
CPC ................ *H02K 1/2773* (2013.01)
(58) Field of Classification Search
CPC ....... H02K 1/276; H02K 1/2773; H02K 29/03

USPC ..................................................... 310/156.56
See application file for complete search history.

(56) References Cited

U.S. PATENT DOCUMENTS

| 2006/0103253 A1* | 5/2006 | Shiga | ............... | H02K 1/2786 310/156.45 |
| 2008/0018190 A1* | 1/2008 | Takahata | ............ | H02K 1/276 310/156.56 |
| 2008/0252166 A1* | 10/2008 | Shiga | ............... | H02K 1/2786 310/156.56 |

(Continued)

FOREIGN PATENT DOCUMENTS

| JP | 2004-215395 A | 7/2004 |
| JP | 2008-029095 A | 2/2008 |

(Continued)

OTHER PUBLICATIONS

International Search Report dated Mar. 1, 2016 as issued in corresponding International Patent Application No. PCT/JP2015/081675.

*Primary Examiner* — Forrest M Phillips
(74) *Attorney, Agent, or Firm* — Foley & Lardner LLP

(57) ABSTRACT

An object is to provide a rotary electric machine capable of suppressing degradation of strength in high-speed rotation and reducing a torque ripple.
A rotor of a rotary electric machine according to the present invention includes a rotor core provided with a magnet insertion hole that forms a space into which a permanent magnet is inserted and a non-magnetic portion facing the space to form a part of the magnet insertion hole, wherein the non-magnetic portion is provided asymmetrically with respect to a d-axis.

8 Claims, 8 Drawing Sheets

(56) References Cited

U.S. PATENT DOCUMENTS

| | | | |
|---|---|---|---|
| 2008/0284271 A1* | 11/2008 | Kim | H02K 1/276 310/156.56 |
| 2008/0296990 A1* | 12/2008 | Evans | H02K 1/276 310/156.56 |
| 2008/0303368 A1* | 12/2008 | Rahman | H02K 1/276 310/156.56 |
| 2009/0230803 A1* | 9/2009 | Nakayama | H02K 1/2766 310/156.56 |
| 2011/0181230 A1* | 7/2011 | Yamada | H02K 1/2746 318/724 |
| 2013/0020898 A1* | 1/2013 | Ryu | H02K 1/276 310/156.56 |

FOREIGN PATENT DOCUMENTS

| | | |
|---|---|---|
| JP | 2008-278591 A | 11/2008 |
| JP | 2011-004480 A | 1/2011 |
| JP | 2011-083047 A | 4/2011 |

* cited by examiner

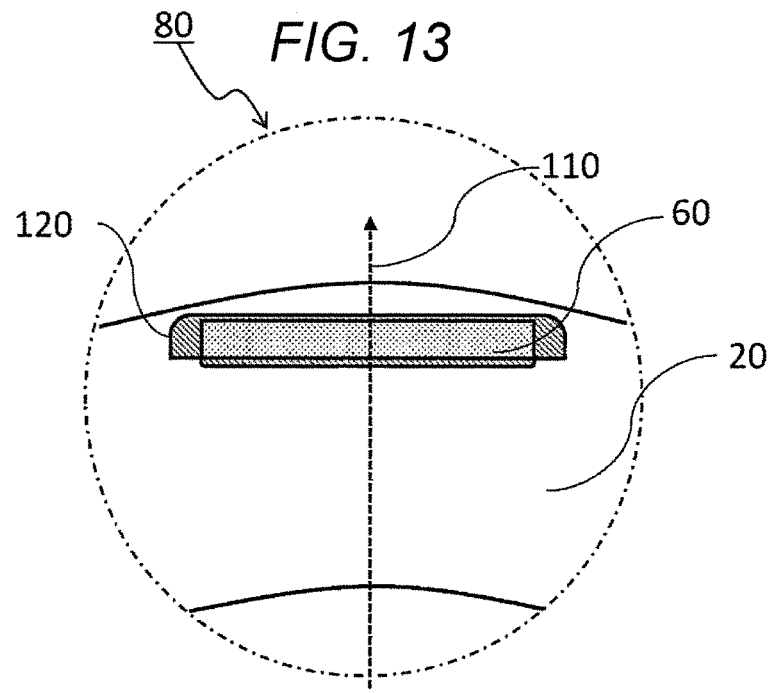
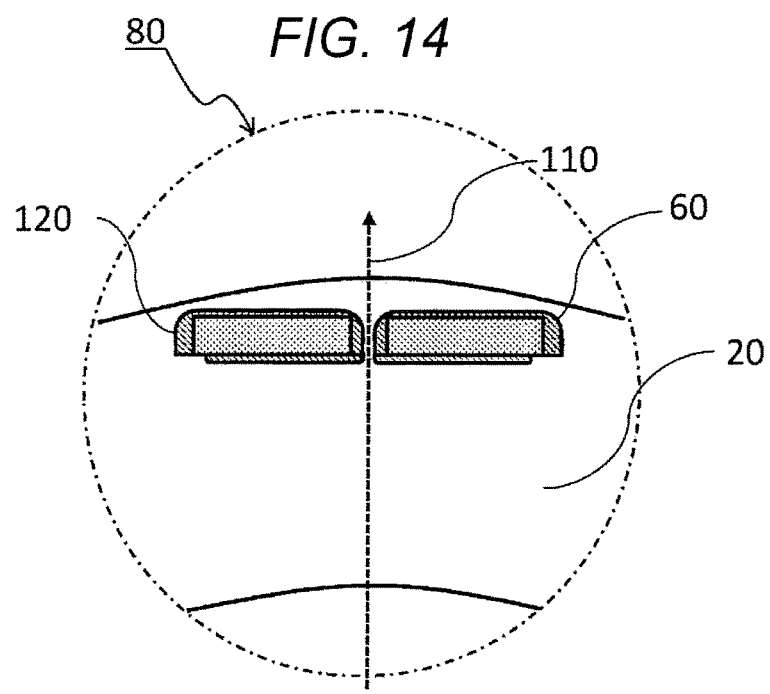

ROTOR OF ROTARY ELECTRIC MACHINE AND ROTARY ELECTRIC MACHINE USING THE SAME

TECHNICAL FIELD

The present invention relates to a rotor of a rotary electric machine provided with a permanent magnet serving as a magnetic field source of the rotor and a rotary electric machine using the same.

BACKGROUND ART

A rotary electric machine mounted on an electric vehicle, a hybrid vehicle, or the like is demanded to reduce a torque ripple. For example, PTL 1 discloses a stator structure of a rotary electric machine provided with a hole between a permanent magnet and the outer circumference in order to reduce a torque ripple.

CITATION LIST

Patent Literature

PTL 1: JP 2008-278591 A

SUMMARY OF INVENTION

Technical Problem

However, if a hole is provided between the permanent magnet and the outer circumference as disclosed in PTL 1, a portion where a core width is extremely narrow may be generated between the outer circumference of the rotor and the permanent magnet. This may generate degradation in strength or torque in high-speed rotation.

An object of the present invention is to provide a rotary electric machine capable of reducing a torque ripple while suppressing degradation of strength in high-speed rotation.

Solution to Problem

In order to solve the problem, a rotor of a rotary electric machine according to the present invention includes a rotor core provided with a magnet insertion hole that forms a space into which a permanent magnet is inserted and a non-magnetic portion facing the space to form a part of the magnet insertion hole, wherein the non-magnetic portion is provided asymmetrically with respect to a d-axis.

Advantageous Effects of Invention

According to the present invention, it is possible to reduce a torque ripple while suppressing degradation of strength in high-speed rotation. Other objects, configurations, and effects than those described above will become apparent by reading the following description of embodiments.

BRIEF DESCRIPTION OF DRAWINGS

FIG. 13 is an enlarged view illustrating the rotor 10 for one pole in the rotary electric machine 100 of the background art.

FIG. 14 is an enlarged view illustrating the rotor 10 for one pole in another configuration of the rotary electric machine 100 of the background art.

DESCRIPTION OF EMBODIMENTS

Figure 1:
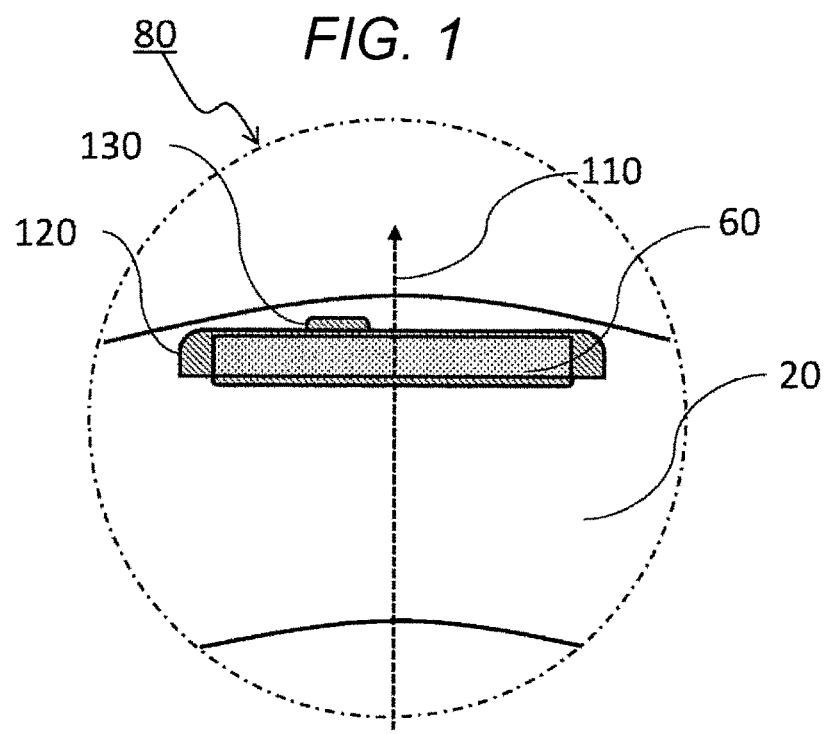
FIG. 1 is an enlarged view illustrating a region 80 of FIG. 6 according to a first embodiment.

Embodiments of the present invention will now be described with reference to the accompanying drawings. While a specific example of the contents of the present invention is discussed in the following description, the present invention is not limited such a description. Various changes or modifications may be possible for a person ordinarily skilled in the art within the scope and spirit of the present invention as disclosed in this specification. Note that, for description purposes, like reference numerals denote like elements throughout overall drawings, and they will not be repeatedly description.

Figure 10:
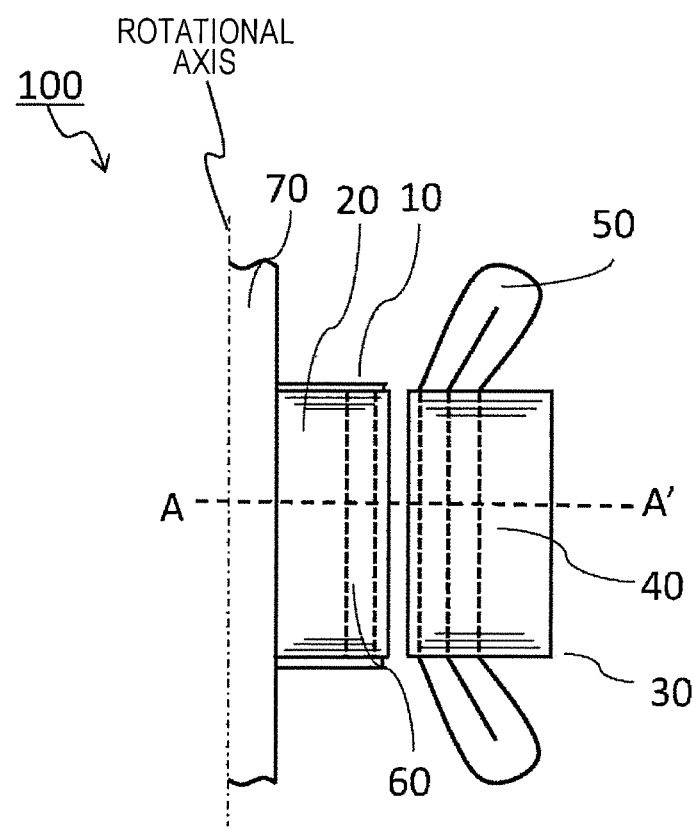
FIG. 10 is a diagram illustrating main parts of a rotary electric machine 100 of the background art.
Figure 11:
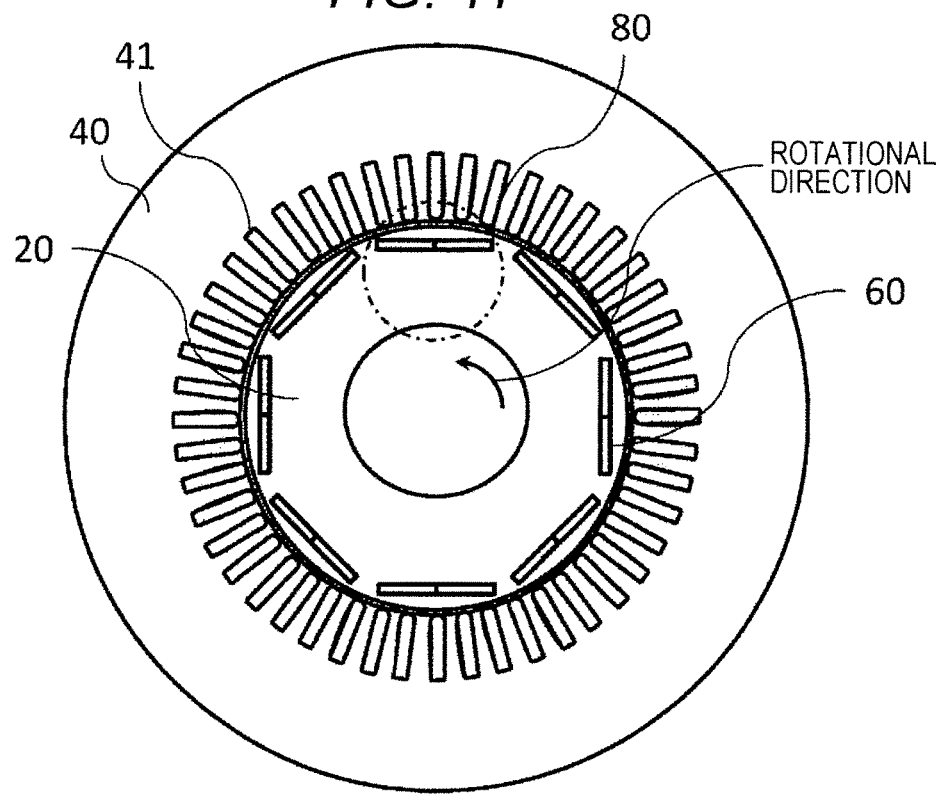
FIG. 11 is a cross-sectional view as seen in an axial direction of the rotary electric machine 100 of the background art.
Figure 12:
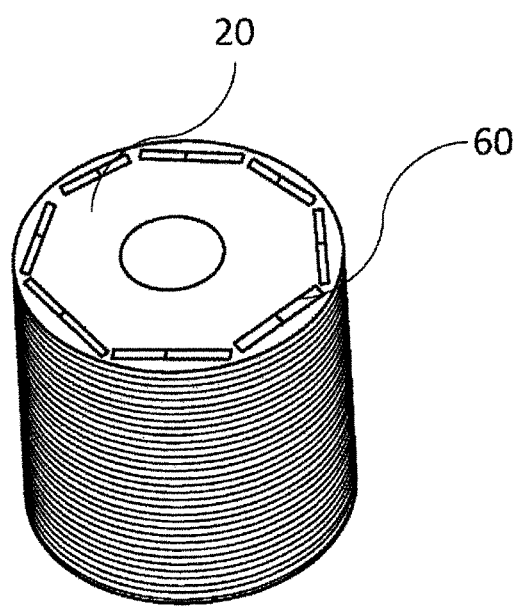
FIG. 12 is an exterior view illustrating a rotor 10 in the rotary electric machine 100 of the background art.

FIG. 10 is a diagram illustrating main parts of a rotary electric machine 100 of the background art. FIG. 10 is a diagram as seen in a radial direction of the rotary electric machine 100 and shows only one side with respect to a rotational axis (illustrated as a one-dotted chain line). FIG. 11 is a cross-sectional view taken along a line A-A' of FIG. 10 in the axial direction. FIG. 12 is an exterior view illustrating a rotor core 20. FIG. 13 is an enlarged view illustrating a configuration of a region 80 of FIG. 11 in the rotary electric machine 100 of the background art.

As illustrated in FIG. 10, the rotary electric machine 100 includes a rotor 10, a rotor core 20, a stator 30, a stator core 40, an armature coil 50, a permanent magnet 60, and a shaft 70.

A plurality of stator slots 41 are disposed in the stator core 40 approximately at equal intervals in a circumferential direction as illustrated in FIG. 11, and the stator coil 50 is wound inside the stator slots 41 as illustrated in FIG. 10. As illustrated in FIG. 12, the rotor 10 is coaxially disposed in the inner circumference side of the stator core 40, and a plurality of permanent magnets 60 are disposed in the rotor 10 approximately at equal intervals in the circumferential direction. As illustrated in FIG. 13, the permanent magnet 60 is inserted into a magnet insertion hole 120 provided in the rotor core 20. A d-axis 110 is also illustrated.

Note that, as illustrated in FIG. 14, the magnet insertion hole 120 may be bisected in the circumferential direction, so that two permanent magnets 60 are provided for one pole in the circumferential direction.

In the following example, the configuration will be described for the region 80 of the rotor for one pole. The other pole may be symmetrically provided to obtain the same effects of the present invention.

In the following examples, it is assumed that a rotation direction is counterclockwise as illustrated in FIG. 11.

Example 1

Figure 6:
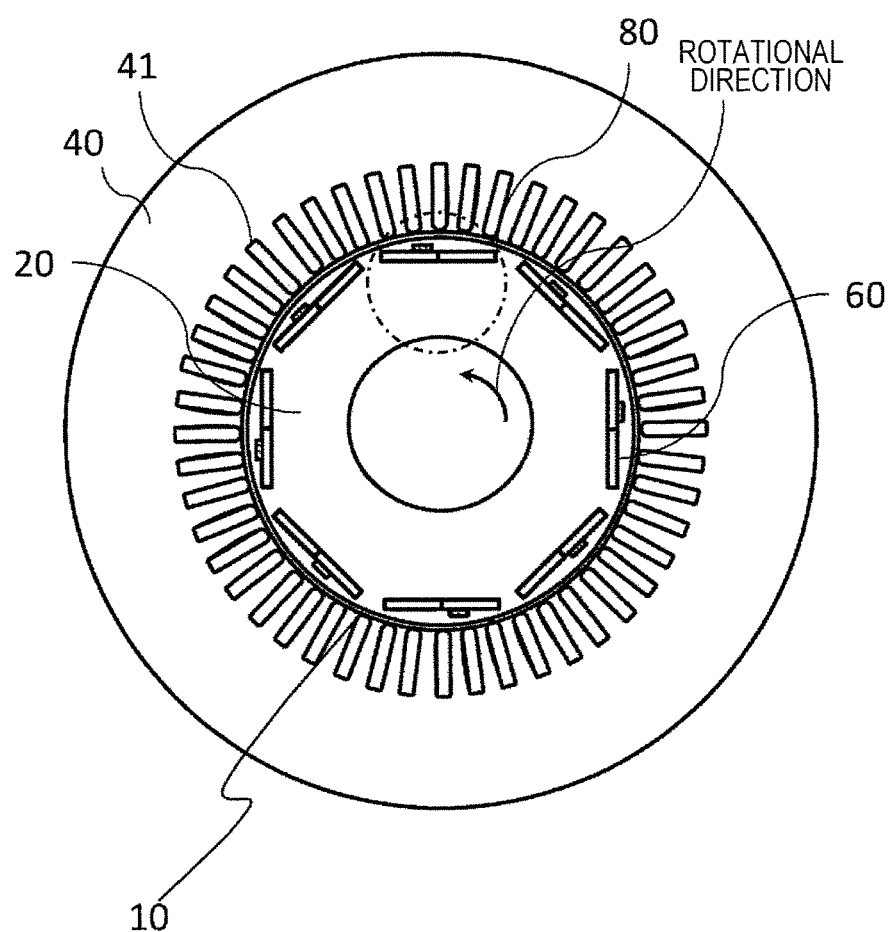
FIG. 6 is a cross-sectional view illustrating a cross section as seen from an axial direction of the rotary electric machine according to the first embodiment.

FIG. 6 is a cross-sectional view illustrating a cross section as seen from the axial direction of the rotary electric machine according to the first embodiment. FIG. 1 is an enlarged view illustrating the region 80 of FIG. 6 according to the first embodiment.

The rotor 10 has a rotor core 20, a permanent magnet 60, and a shaft 70 (refer to FIG. 10). The rotor core 20 is formed by stacking a plurality of steel plates. Each of the steel plates is provided with a magnet insertion hole 120 by punching or the like. The permanent magnet 60 is stored in this magnet insertion hole 120. The stator 30 (not shown) is disposed in the outer circumference side of the rotor 10 (refer to FIG. 10).

The rotor core 20 is provided with a non-magnetic portion 130 communicating with the magnet insertion hole 120. In other words, the non-magnetic portion 130 is disposed in a position facing a space formed by the magnet insertion hole 120 to form a part of the magnet insertion hole 120.

According to this embodiment, a rotational direction of the rotor 10 is counterclockwise as illustrated in FIG. 6, and this counterclockwise direction is defined as a motor driving direction. As illustrated in FIG. 1, a position of the non-magnetic portion 130 is in a leading side in the rotational direction from the d-axis 110 as a center of a magnetic pole. When a motor is driven, a magnetic flux density in the rotation leading side of the rotor 10 is high. In addition, since the non-magnetic portion 130 is provided in the rotation leading side, influence on a torque ripple is significant.

The non-magnetic portion 130 communicates with the magnet insertion hole 120 and can be provided without degrading manufacturability by forming integrally when punching from the steel plate.

By providing the non-magnetic portion 130 in communication with the magnet insertion hole 120, a loss caused by air resistance at the outer circumferential portion does not increase. Even in oil immersion for lubrication or cooling, a loss caused by stirring does not increase.

The non-magnetic portion 130 is provided without forming an extremely narrow portion of the core width between the outer circumference of the rotor core 20 and the permanent magnet 60. Therefore, it is possible to secure strength at high-speed rotation and avoid torque reduction because there is no intervention in the magnetic flux.

Figure 2:
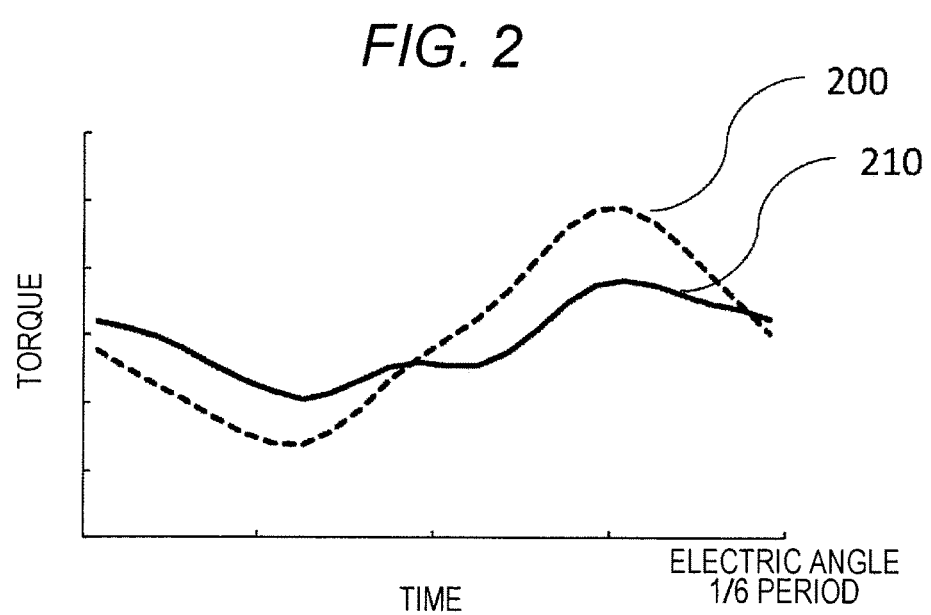
FIG. 2 is a diagram illustrating torque ripple waveforms of a rotary electric machine according to the first embodiment and a rotary electric machine of the background art.

FIG. 2 is a computation result of the torque ripple waveform. Compared to the waveform 200 in the case where the non-magnetic portion 130 is not provided, the waveform 210 in the case where the non-magnetic portion 130 is provided has a smaller amplitude, so that the torque ripple is reduced. Meanwhile, an average torque value does not change nearly between both cases. The cause of the torque ripple is the change in the magnetic resistance by the stator slot 41 shown in FIG. 6. However, by providing the non-magnetic portion communicating with the magnet insertion hole 120 according to this embodiment, an abrupt change of the magnetic resistance is alleviated. Therefore, as illustrated in FIG. 2, it is possible to reduce the torque ripple while maintaining the average torque value.

Figure 3:
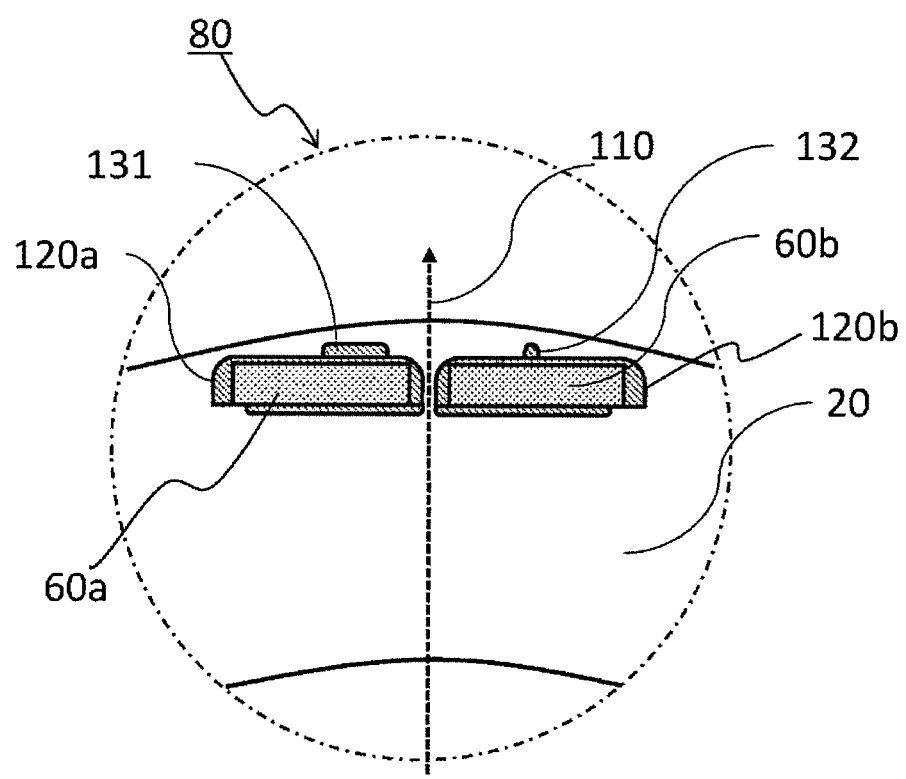
FIG. 3 is an enlarged view illustrating a rotor for one pole in a rotary electric machine according to a modification of the first embodiment.

FIG. 3 is an enlarged view illustrating the rotor for one pole of the rotary electric machine according to a modification of the first embodiment. The magnet insertion hole is bisected into a first magnet insertion hole 120a and a second magnet insertion hole 120b with respect to the d-axis 110 in the circumferential direction. In addition, the first permanent magnet 60a is stored in the first magnet insertion hole 120a, and the second permanent magnet 60b is stored in the second magnet insertion hole 120b.

The non-magnetic portion 131 is formed to communicate with the first magnet insertion hole 120a in the leading side in the rotational direction. The non-magnetic portion 132 is formed to communicate with the second magnet insertion hole 120b in the lagging side in the rotational direction. The non-magnetic portion 131 is formed to be larger than the non-magnetic portion 132 in the circumferential direction. As a result, it is possible to effectively reduce the torque ripple.

Note that a place where the non-magnetic portions 130 to 132 are disposed communicates with the magnet insertion hole 120. Therefore, resin or the like may be filled in order to hold the permanent magnet 60.

Example 2

Figure 4:
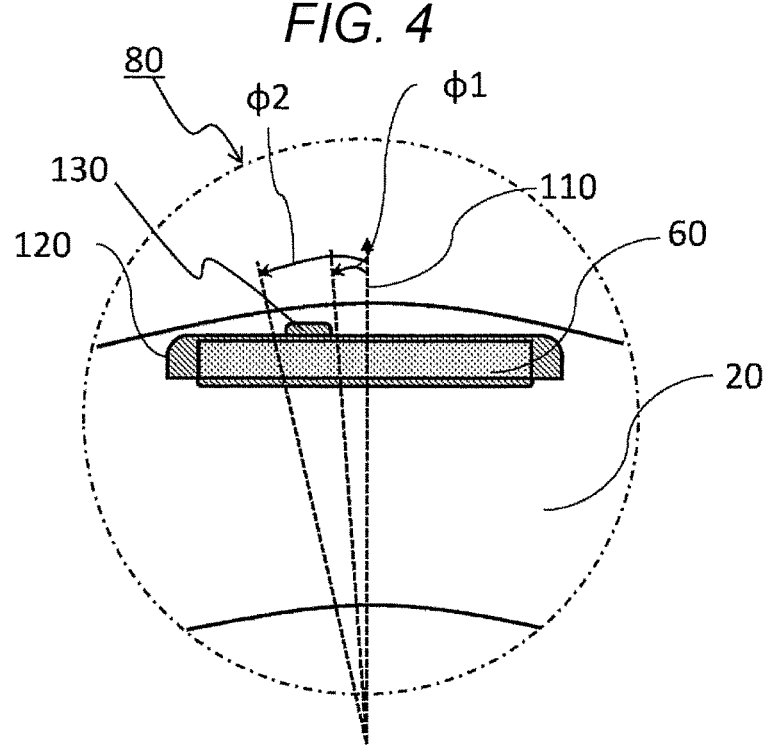
FIG. 4 is an enlarged view illustrating a rotor 10 for one pole in a rotary electric machine according to a second embodiment.

FIG. 4 is an enlarged view illustrating a rotor 10 for one pole in the rotary electric machine according to a second embodiment.

In this embodiment, assuming that the rotational direction is counterclockwise, that is, a motor driving direction, a circumferential position of the non-magnetic portion 130 is set to an electric angle range between $\phi1=12°$ and $\phi2=38°$ in a rotation leading direction from the d-axis 110 as a center of the magnetic pole. When a motor is driven, a magnetic flux density in the rotation leading side of the rotor 10 is high. In addition, since the non-magnetic portion 130 is provided in the rotation leading side, influence on the torque ripple is significant.

Figure 5:
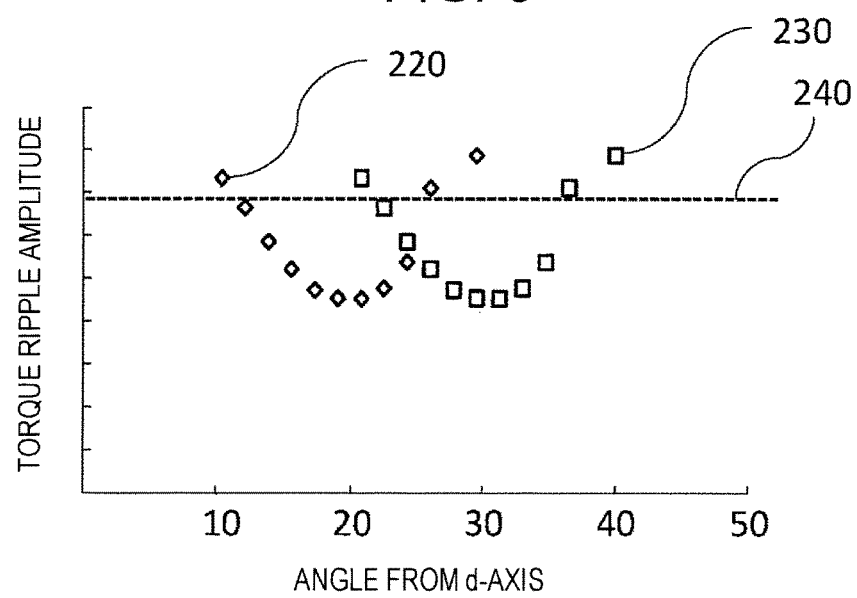
FIG. 5 is a diagram illustrating torque ripple amplitudes of the rotary electric machine according to the second embodiment and the rotary electric machine of the background art.

FIG. 5 illustrates a relationship between electric angle positions from the d-axis in the rotation leading side end and the rotation lagging side end of the non-magnetic portion 130 and the torque ripple amplitude. It is recognized that, when the electric angle from the d-axis is smaller than 12° in the torque ripple amplitude 220 of the rotation leading side end position of the non-magnetic portion 130, and the electric angle from the d-axis is larger than of 38° in the torque ripple amplitude 230 of the rotation lagging side end position of the non-magnetic portion 130, the torque ripple amplitudes 220 and 230 in both cases are higher than the torque ripple amplitude 240 in the case where no non-magnetic portion is provided.

According to this embodiment, the circumferential position of the non-magnetic portion 130 has an electric angle range between 12° and 38° in the rotation leading direction from the d-axis 110. As a result, it is possible to effectively reduce the torque ripple.

Example 3

Figure 7:
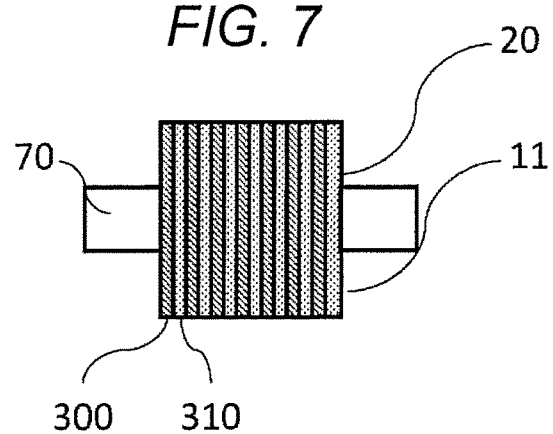
FIG. 7 is a diagram illustrating a rotor 11 of a rotary electric machine according to a third embodiment.

FIG. 7 is a diagram illustrating a rotor 11 of a rotary electric machine according to a third embodiment. As illustrated in FIG. 7, the rotor core 20 is formed by alternately stacking a plurality of steel plates 300 and 310.

Figure 8:
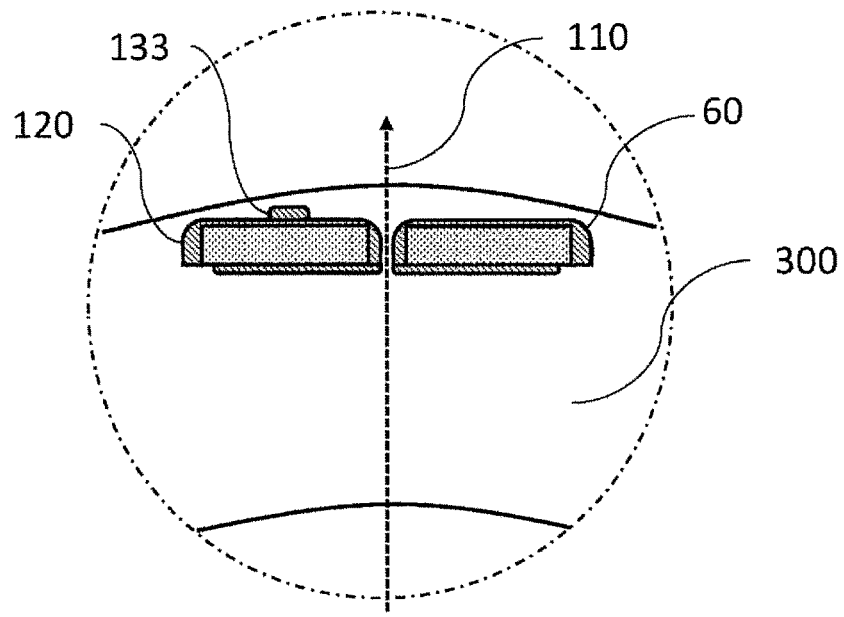
FIG. 8 is an enlarged view illustrating a steel plate 300 for one pole in a rotor core 20 according to the third embodiment.
Figure 9:
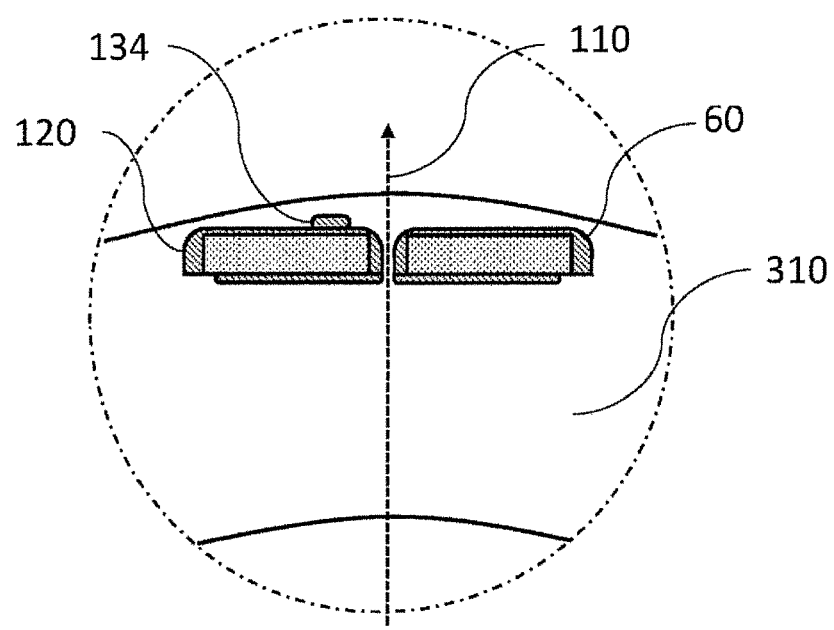
FIG. 9 is an enlarged view illustrating a steel plate 310 for one pole in the rotor core 20 according to the third embodiment.

FIG. 8 is an enlarged view illustrating the steel plate 300 for one pole in the rotor core 20 according to the third embodiment. FIG. 9 is an enlarged view illustrating the steel plate 310 for one pole in the rotor core 20 according to the third embodiment.

The non-magnetic portion 133 of the steel plate 300 is disposed in the rotation leading side relative to the non-magnetic portion 134 of the steel plate 310. The non-magnetic portion 134 of the steel plate 310 is disposed in the rotation lagging side relative to the non-magnetic portion 133 of the steel plate 300.

Comparing FIGS. 8 and 9, FIG. 8 is a cross-sectional view illustrating the non-magnetic portion 133 having a slightly wide width provided in the rotation leading side, and FIG. 9 is a cross-sectional view illustrating the non-magnetic portion 134 having a slightly narrow width provided in the rotation lagging side. By alternately stacking them, it is possible to obtain the rotor core 20 having an intermediate characteristic between both cross sections.

According to this embodiment, it is possible to reduce a desired order harmonic component when the torque is affected overlappingly by the harmonics in addition to the slot due to an influence of the power source and the like.

Note that the circumferential position of the non-magnetic portion and the number of the combined non-magnetic portions may be determined by performing computation and measurement depending on a desired characteristic. In addition, the number of the stacks is not limited to one, but a plurality of stacks may be provided. Furthermore, in order to secure a holding strength of the permanent magnet, the number of the stacked steel plates may be determined without providing the non-magnetic portion.

REFERENCE SIGNS LIST

10 . . . rotor
20 . . . rotor core
30 . . . stator
40 . . . stator core
41 . . . stator slot
50 . . . armature coil
60 . . . permanent magnet
60a . . . first permanent magnet
60b . . . second permanent magnet
70 . . . shaft
80 . . . region
100 . . . rotary electric machine
110 . . . d-axis
120 . . . magnet insertion hole
120a . . . first magnet insertion hole
120b . . . second magnet insertion hole
130 . . . non-magnetic portion
131 . . . non-magnetic portion
132 . . . non-magnetic portion
200 . . . torque waveform in case where no non-magnetic portion 130 is provided
210 . . . torque waveform in case where non-magnetic portion 130 is provided
220 . . . torque ripple amplitude in rotation leading side end position of non-magnetic portion
230 . . . torque ripple amplitude in rotation lagging side end position of non-magnetic portion
240 . . . torque ripple amplitude in case where no non-magnetic portion is provided
300 . . . steel plate
310 . . . steel plate

The invention claimed is:

1. A rotor of a rotary electric machine comprising a rotor core provided with a magnet insertion hole that forms a space into which a permanent magnet is inserted and a non-magnetic portion facing the space to form a part of the magnet insertion hole,
wherein the non-magnetic portion is provided asymmetrically with respect to a d-axis and
wherein the non-magnetic portion is provided in an electric angle position between 12° and 38° from the d-axis.

2. The rotor of the rotary electric machine according to claim 1, wherein the d-axis passes through a center of the magnet insertion hole.

3. The rotor of the rotary electric machine according to claim 1, wherein the rotor core is formed by alternately stacking steel plates having different positions of the non-magnetic portions.

4. A rotary electric machine comprising:
the rotor according claim 1; and
a stator provided in an outer circumference side of the rotor by interposing a gap.

5. A rotor of the rotary electric machine comprising a rotor core provided with a magnet insertion hole that forms a space into which a permanent magnet is inserted and a non-magnetic portion facing the space to form a part of the magnet insertion hole,
wherein the non-magnetic portion is provided asymmetrically with respect to a d-axis,
wherein the magnet insertion hole includes a first magnet insertion hole that forms a first space into which the first permanent magnet is inserted and a second magnet insertion hole that forms a second space into which the second permanent magnet is inserted,
the non-magnetic portion includes a first non-magnetic portion facing the first space to form a part of the first magnet insertion hole, and a second non-magnetic portion facing the second space to form a part of the second magnet insertion hole, and
the first non-magnetic portion is formed to be larger than the second non-magnetic portion in a circumferential direction with respect to the d-axis.

6. The rotor of the rotary electric machine according to claim 5, wherein the non-magnetic portion is provided in an electric angle position between 12° and 38° from the d-axis.

7. The rotor of the rotary electric machine according to claim 5, wherein the d-axis passes through a center of the magnet insertion hole.

8. The rotor of the rotary electric machine according to claim 5, wherein the rotor core is formed by alternately stacking steel plates having different positions of the non-magnetic portions.

* * * * *